United States Patent
van Hoff et al.

(10) Patent No.: US 8,788,925 B1
(45) Date of Patent: Jul. 22, 2014

(54) AUTHORIZED SYNDICATED DESCRIPTIONS OF LINKED WEB CONTENT DISPLAYED WITH LINKS IN USER-GENERATED CONTENT

(75) Inventors: Arthur A. van Hoff, Menlo Park, CA (US); David Z. Creemer, Palo Alto, CA (US)

(73) Assignee: Flipboard, Inc., Palo Alto, CA (US)

( * ) Notice: Subject to any disclaimer, the term of this patent is extended or adjusted under 35 U.S.C. 154(b) by 7 days.

(21) Appl. No.: 13/188,114

(22) Filed: Jul. 21, 2011

(51) Int. Cl.
*G06F 17/22* (2006.01)

(52) U.S. Cl.
USPC .......................... 715/205; 715/234; 715/760

(58) Field of Classification Search
USPC ......... 715/200, 201, 203, 204, 205, 212, 226, 715/234, 255, 256, 273, 700, 701, 760, 202, 715/207, 208, 209, 210, 254, 274, 704, 715, 715/716, 731, 756, 762, 772, FOR. 209, 715/FOR. 210
See application file for complete search history.

(56) References Cited

U.S. PATENT DOCUMENTS

| | | | |
|---|---|---|---|
| 7,953,725 B2 * | 5/2011 | Burris et al. ................... | 707/710 |
| 7,957,723 B2 * | 6/2011 | Punaganti Venkata et al. .......................... | 455/412.1 |
| 8,190,997 B2 * | 5/2012 | Shellen et al. ................ | 715/733 |
| 8,200,775 B2 * | 6/2012 | Moore .......................... | 709/217 |
| 8,312,364 B2 * | 11/2012 | Rowe et al. ................... | 715/205 |
| 2002/0156905 A1 * | 10/2002 | Weissman ..................... | 709/229 |
| 2003/0195877 A1 * | 10/2003 | Ford et al. ......................... | 707/3 |
| 2006/0073812 A1 * | 4/2006 | Punaganti Venkata et al. .......................... | 455/412.1 |
| 2006/0112076 A1 * | 5/2006 | Burris et al. ....................... | 707/3 |
| 2006/0173985 A1 * | 8/2006 | Moore .......................... | 709/223 |
| 2007/0038712 A1 * | 2/2007 | Affronti et al. ............... | 709/206 |
| 2007/0061711 A1 * | 3/2007 | Bodin et al. .................. | 715/523 |
| 2007/0067725 A1 * | 3/2007 | Cahill et al. .................. | 715/733 |
| 2007/0083468 A1 * | 4/2007 | Wetherell ........................ | 705/51 |
| 2007/0083520 A1 * | 4/2007 | Shellen et al. ................. | 707/10 |
| 2007/0083536 A1 * | 4/2007 | Darnell et al. ................ | 707/101 |
| 2007/0094365 A1 * | 4/2007 | Nussey et al. ................ | 709/223 |
| 2007/0094389 A1 * | 4/2007 | Nussey et al. ................ | 709/225 |
| 2007/0100959 A1 * | 5/2007 | Eichstaedt et al. ........... | 709/217 |
| 2007/0116036 A1 * | 5/2007 | Moore .......................... | 370/462 |
| 2007/0156809 A1 * | 7/2007 | Dickinson et al. ........... | 709/203 |
| 2007/0204308 A1 * | 8/2007 | Nicholas et al. ................ | 725/86 |
| 2007/0219908 A1 * | 9/2007 | Martinez ........................ | 705/51 |
| 2007/0219910 A1 * | 9/2007 | Martinez ........................ | 705/51 |
| 2007/0220016 A1 * | 9/2007 | Estrada et al. ................ | 707/100 |
| 2008/0046369 A1 * | 2/2008 | Wood ............................. | 705/50 |
| 2008/0281832 A1 * | 11/2008 | Pulver et al. ................. | 707/100 |
| 2010/0241579 A1 * | 9/2010 | Bassett et al. ................ | 705/319 |
| 2011/0066930 A1 * | 3/2011 | Rowe et al. ................... | 715/205 |

* cited by examiner

*Primary Examiner* — Maikhanh Nguyen
(74) *Attorney, Agent, or Firm* — Fenwick & West LLP

(57) ABSTRACT

Syndicated descriptions of web content are obtained from feeds. For each item of each feed, a link is followed to a content page, and it is determined whether the content page directly or indirectly points back to the feed. If so, the description of the item from the feed is stored as an authorized description with a canonical form of the link to the item. Subsequently, when an item of user-generated content that includes a link to web content is received, the link to the web content is canonicalized. Based on the canonicalized link, any stored authorized syndicated descriptions of the linked content is obtained. If more than one authorized syndicated description of an item of linked content is available, one is selected. Then, the item of user-generated content containing a link can be published with an authorized syndicated description of the linked content.

9 Claims, 7 Drawing Sheets

AUTHORIZED SYNDICATED DESCRIPTIONS OF LINKED WEB CONTENT DISPLAYED WITH LINKS IN USER-GENERATED CONTENT

BACKGROUND

1. Field of the Invention

This invention relates generally to automatically obtaining and providing authorized syndicated descriptions of web content.

2. Description of the Related Art

User-generated content such as blog postings, tweets, posts on social networking pages, text messages, and the like, frequently contains links to web content, such as news media articles. To provide a reader of the user-generated content with greater context for the linked content and a richer experience overall, it is desirable to include an excerpt, summary, image, or other portion or description of the linked content along with the user-generated content that contains the link. However, copying the entirety of linked content (e.g., the entire news article) to post in connection with the user-generated content that links to it, without permission from the owner of the linked content, may violate copyright laws. Obtaining permission on an individual basis is impractical.

SUMMARY

In various embodiments, syndicated descriptions of web content are automatically identified from feeds. A set of known feeds are provided to a crawler. Some of the feeds may be authorized feeds, and some of them may be unauthorized. The authorized feeds are those which have permission or approval from the source to provide information about the source's content items, whereas unauthorized feeds provide information about the source's content items without permission or approval. The crawler accesses each of the feeds to obtain the newest items from the feeds. A feed item contains a link to a content page and a description of the content of the page. For each such item of each feed, the link is followed to the content page. The metadata of the page is searched for a pointer to the feed from which the linked content page was accessed. If no pointer to the feed is found, the root of the domain for the content page address is checked, and all links on the content page are resolved to determine whether the content page indirectly points back to the feed. If the page directly or indirectly points back to the feed from which it was accessed, then this indicates that the feed is authorized. Accordingly, the description of the item from the feed is stored in a feed mapping database as an authorized syndicated description of the linked item along with the link to the item. In one embodiment, the link to the item is stored in canonical form.

According to another aspect of the invention, an item of user-generated content that includes a link to another item of content can be published with an authorized syndicated description of the linked item. When an item of user-generated content that includes a link to web content is received, the link to the web content is canonicalized. Then, based on the canonicalized link, any matching feed items from the feed mapping database are obtained. The feed mapping database stores authorized syndicated descriptions of linked content that were obtained from feeds. If more than one syndicated description of an item of linked content is available, a selection is made from among the options according to at least one selection criteria. For example, the longest description may be preferred, and among descriptions of equal length, a preference may be given to a description that includes an image.

The features and advantages described in this summary and the following detailed description are not all-inclusive. Many additional features and advantages will be apparent to one of ordinary skill in the art in view of the drawings, specification, and claims hereof.

One skilled in the art will readily recognize from the following discussion that alternative embodiments of the structures and methods illustrated herein may be employed without departing from the principles of the invention described herein.

DETAILED DESCRIPTION OF THE EMBODIMENTS

System Overview

User-generated content such as blog postings, tweets, text messages, posts on social networking pages, and the like, frequently contains links to other content, such as news articles, videos, photographs, and the like. To provide a reader of the user-generated web content with greater context for the linked content and a richer experience overall, it is desirable to include an excerpt, summary, image, or other portion or description of the linked content along with the user-generated web content. In various embodiments, the present invention enables various mechanisms which can obtain authorized syndicated descriptions of content that is linked to from user-generated content. Subsequently, the user-generated content can be published with an authorized syndicated description of the linked content.

An authorized syndicated description of an item of content offers several advantages as compared to traditional techniques of excerpting from linked content to provide a description. Specifically, an authorized syndicated description of an item may be both more helpful to a reader and more accurate than excerpted content. A syndicated description, because it was intended to be distributed as a short synopsis of the item, often captures the larger meaning or significance of an item in a concise statement that might be missed in a simple text excerpt, snippet, or the like. Additionally, an authorized description is one that has been distributed by the content owner or an entity authorized by the content owner, which indicates that the content owner may wield some editorial control to assure that the description is accurate. To obtain the benefit of these and other advantages, embodiments of the invention identify, collect, and publish authorized syndicated descriptions of items of web content.

Figure 1:
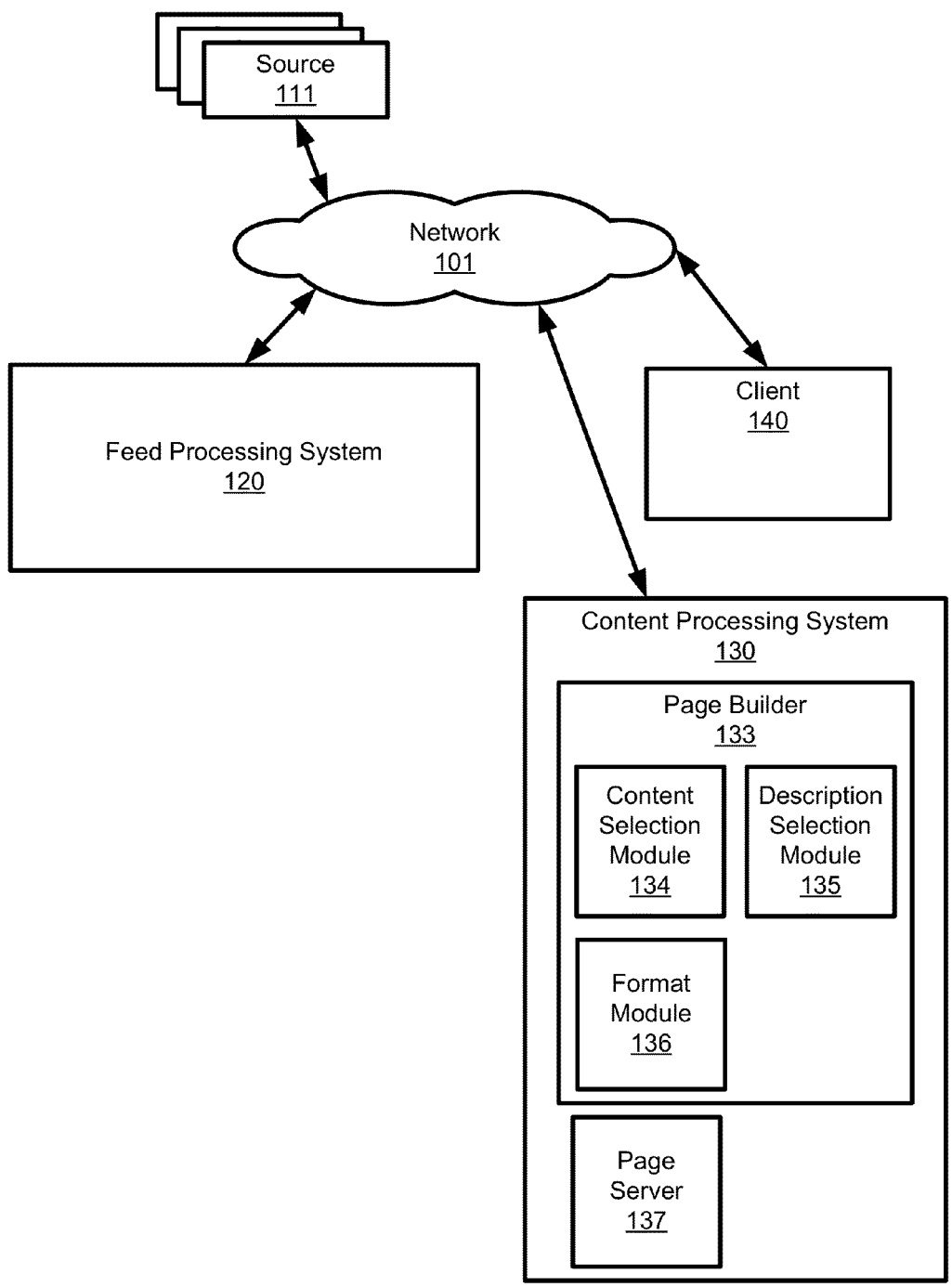
FIG. 1 is a high-level block diagram of a system environment in accordance with an embodiment of the invention.

FIG. 1 is a high-level block diagram of a system environment in accordance with one embodiment. The system environment includes a plurality of sources 111, a feed processing system 120, a content processing system 130 and at least one client 140 connected via a network 101, such as the Internet.

The sources 111 include a plurality of web content sources such as news websites, web magazines, video sharing sites, music sharing sites, and other web pages published by any web publisher. The sources 111 can also include user-generated web pages such as blogs, and social networking pages, and the like. Generally, the content of each of the sources 111 is an intellectual property asset of the author of the source. Accordingly, the wholesale copying of a source without the author's permission would likely not be proper in most circumstances.

The feed processing system 120 processes feeds from sources 111, verifies whether the feeds contain authorized descriptions of content on web pages, and stores mappings between web pages and authorized feeds for those web pages. In the interest of gaining a wider audience, some publishers maintain syndicated feeds, such as newsfeeds or web feeds (using, e.g., RSS, Atom, or other formats) for various ones of their sources 111. Subscribers to a feed receive notification of content updates for the source. Generally, authorized feeds contain descriptions of content that are intended by the content publishers to be shared and republished on other websites and in other contexts. Authorized feeds of a website are identified within the metadata of a particular website, such as in a meta header or meta tag. In some cases, an unauthorized party generates a post, such as a commentary, and includes a link to a published article. The commentary by the third party is not authorized, and may not represent the published article accurately. In other cases, unauthorized third parties will access the website and create a feed for the website. To address these issues, the feed processing system 120 is configured to verify whether a feed is an authorized feed for a web page, and to store mappings between web pages and authorized feeds for those web pages. The feed processing system 120 will be described in greater detail below with reference to FIGS. 4-5.

Referring again to FIG. 1, the content processing system 130 includes a page builder 133 that builds pages from the received content, and a page server 137 that serves the pages built by the page builder 133. The feed processing system 120 and the content processing system 130 may each be implemented using a single computer, or a network of computers, including cloud-based computer implementations. The computers are preferably server class computers including one or more high-performance CPUs and 1G or more of main memory, as well as 500Gb to 2Tb of computer readable, persistent storage, and running an operating system such as Linux or variants thereof. The operations of these systems as described herein can be controlled through either hardware or through computer programs installed in computer storage and executed by the processors of such servers to perform the functions described herein. The systems include other hardware elements necessary for the operations described here, including network interfaces, networking devices (e.g., routers, firewalls) and protocols, input devices for data entry, and output devices for display, printing, or other presentations of data, which are not shown so as to not obscure the relevant details of the system.

The operation of the content processing system 130 will now be described with reference to FIG. 2, which illustrates a method of building a page in accordance with an embodiment. First, the content processing system 130 receives 201 content from sources 111 via the network 101. From the received sources, the content processing system 130 will build pages.

The page builder 133 includes a content selection module 134, a description selection module 135, and a format module 136. One embodiment of the operation of the page builder 133 will be discussed in greater detail below with regard to FIG. 6. Generally, however, referring again to FIG. 2, the content selection module 134 of the page builder 133 selects 202 the content for a page from among content from a variety of sources 111 received by the content processing system 130. The content selection module 134 may select content based on user requests received from clients 140, user preferences stored in the content processing system 130, or may select content based on any other set of rules governing the selection of content.

The description selection module 135 of the page builder 133 selects 203 a description for linked content to present with a link to that linked content. The description may be an authorized syndicated description of the linked content from an authorized feed, if available. If no authorized syndicated description of the linked content is available, an excerpt may be created from the linked content according to any excerpting technique known to those of skill in the art, such as obtaining a fifty-word snippet of text from the linked content.

The format module 136 of the page builder 133 formats 204 the content selected by the content selection module 134 and the description of the linked content selected by the description selection module 135 into a format suitable for presentation on a page. Then, the page server 137 serves 205 the formatted page built by the page builder 133 to a client 140.

Figure 3A:
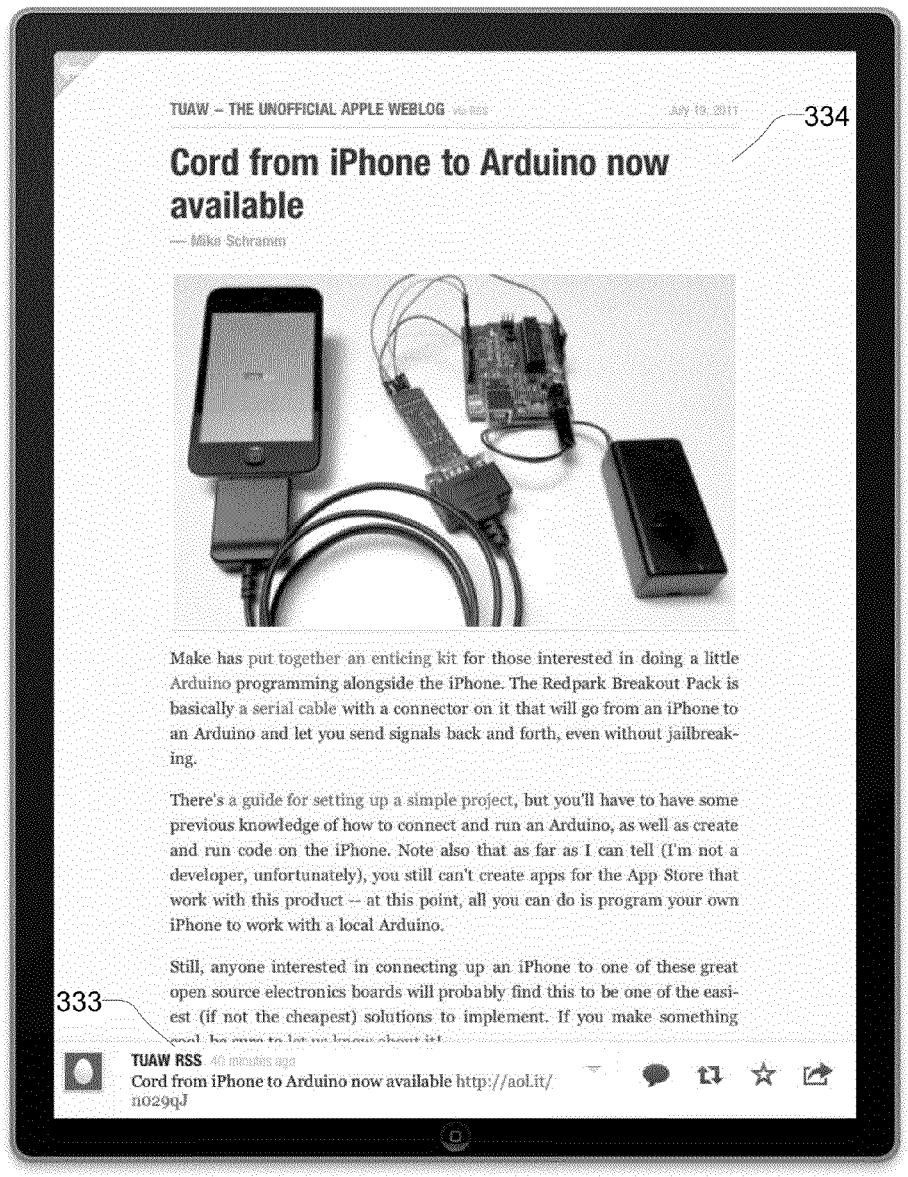
FIG. 3A illustrates an example of a feed item that includes a syndicated description of the linked content.
Figure 3B:
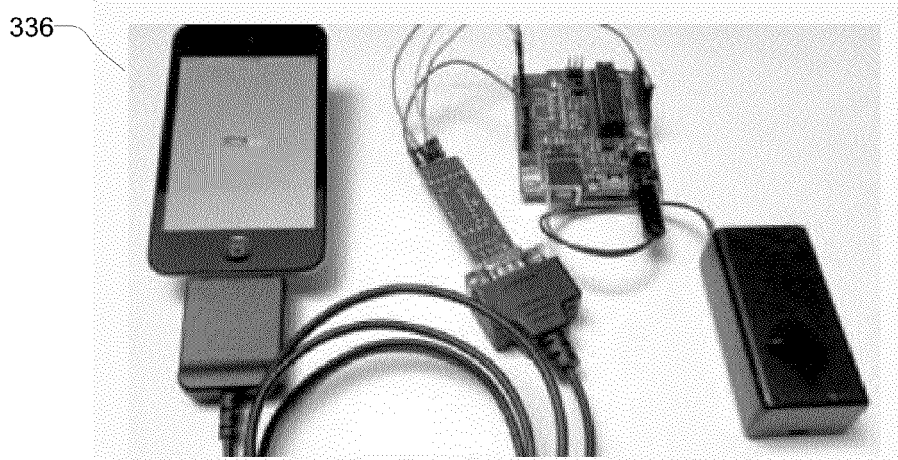
FIG. 3B illustrates an example of an excerpt and an image derived from the linked content.

The client 140 can be any computing device equipped with a browser for accessing web pages and a display for viewing them, such as a personal computer, a tablet PC, or a mobile device. The client 140 receives the formatted page and displays it to the user. FIG. 3A illustrates an example of an RSS feed item 333 that includes a description 334 of the linked content. In this case, the description 334 of the linked content is a full syndicated version of the linked content, including text and an image. In other cases, the syndicated description of the linked content may be a summary, a sentence, an image, or the like. FIG. 3B illustrates an example including an excerpt of text 335 and an image 336 derived from the linked content itself. In most cases, the syndicated description 334, such as the one shown in FIG. 3A, is better (i.e., more accurate and/or more complete) than an excerpt derived from the linked content, such as the one shown in FIG. 3B. Moreover, an authorized syndicated description 334 is always indicative of the publisher's syndication intents. Thus, as described above, it is desirable to use an authorized syndicated description if it is available, rather than an excerpt.

Figure 2:
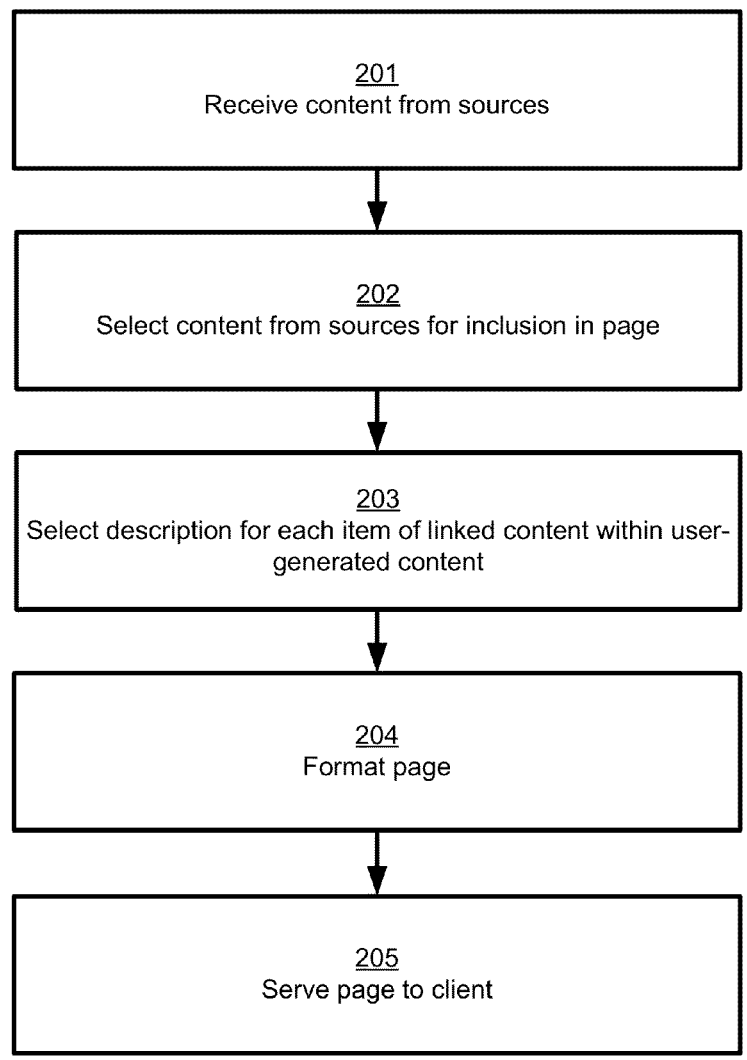
FIG. 2 illustrates a method of building a page including at least one user-generated content item containing a link to another item of web content, in accordance with an embodiment.

In sum, FIGS. 1-3 have shown and described an overview of a system that is used to build and serve web pages including content from a variety of sources. When a user-generated item of content for a page includes a link to another item of web content, the system identifies, where available, an authorized syndicated description of the linked content to display with the user-generated item of content. By providing an authorized syndicated description of the linked content within a served webpage, the system provides a user of the page with greater context for the link and a richer experience with the page.

The following section describes methods of building a corpus of syndicated descriptions of linked web pages, and, subsequently, methods of using the corpus to obtain a syndicated description of linked content for use in building a webpage, in accordance with various embodiments of the invention.

Syndicated Descriptions

Figure 4:
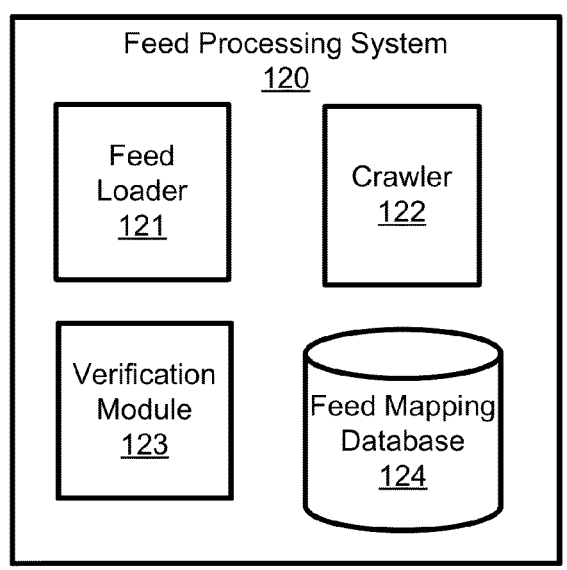
FIG. 4 is a block diagram of a feed processing system, in accordance with an embodiment.
Figure 5:
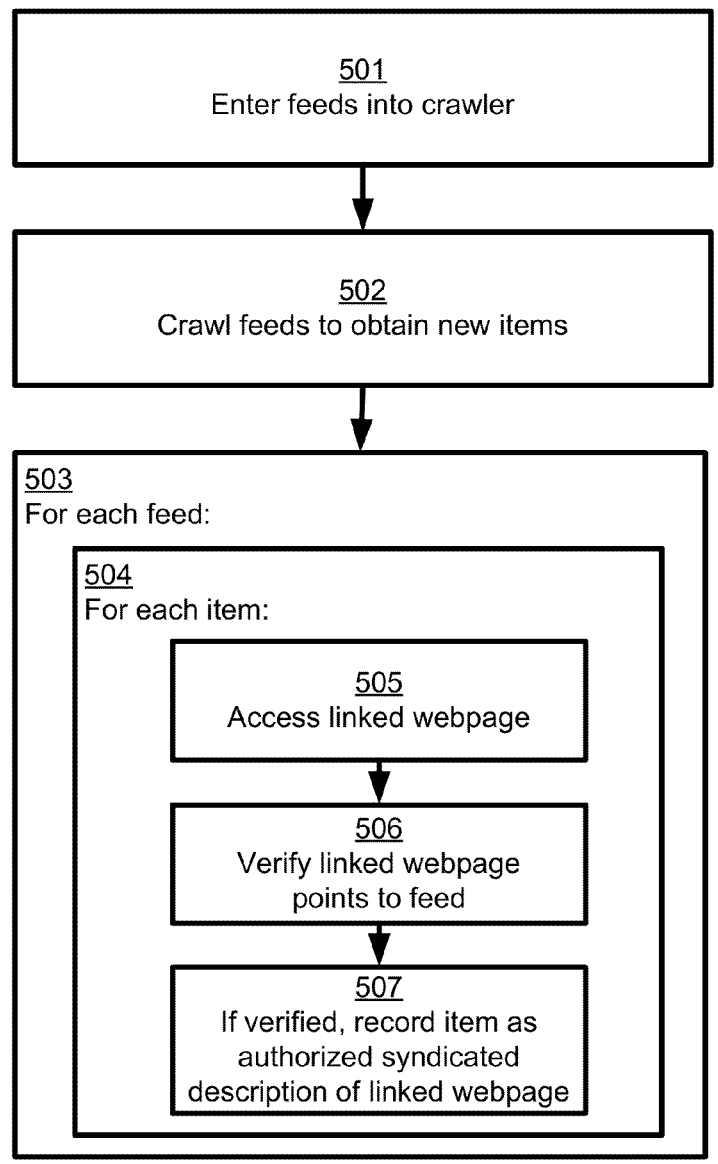
FIG. 5 illustrates a method of building a corpus of syndicated descriptions of linked web pages, in accordance with an embodiment.

As described above, the present invention is configured to obtain authorized syndicated descriptions of web content so that they can be used subsequently to describe linked web content in connection with displaying a link to the content. For example, in connection with the display of a blog entry that discusses a recent news article and contains a link to the news article, a syndicated description of the news article can be displayed with the link to the news article. To expedite the building of a page that includes a syndicated description of linked content, in one embodiment, available authorized syndicated descriptions of content are collected in advance by the feed processing system 120. As shown in FIG. 4, the feed processing system 120 includes a feed loader, a crawler 122, a verification module 123, and a feed mapping database 124. The operation of the feed processing system 120 to build a corpus of syndicated descriptions of linked web pages will now be described with reference to FIG. 5.

The feed loader 121 accepts new feeds as they are input into the feed processing system 120. As new feeds are discovered and input into the feed processing system 120, the feed loader 121 enters 501 the new feeds into the crawler 122. The authorized feeds for an item of web content are those which have permission or approval from the source to provide information about the source's content item, whereas unauthorized feeds for an item of web content provide information about the content item without permission or approval from the source. Some of the feeds input into the feed processing system 120 are authorized for certain web content. Others of the feeds may be unauthorized for certain web content. Still others of the feeds may contain a mix of descriptions that are authorized for certain items of web content and descriptions that are unauthorized for other items of web content.

The crawler 122 crawls 502 the feeds received from the feed loader 121 to obtain content updates from the feeds. Although only one crawler 122 is shown in FIG. 4 for simplicity, any number of crawlers may work in parallel to service the feed loader 121. The crawler 122 crawls the feeds periodically to obtain the latest updates, for example, every hour, but optionally the crawler 122 may be configured to obtain the new items from the feeds either more or less frequently than hourly. A content update to a feed comprises a list of one or more items, where each item in the list includes a link to a webpage (i.e., URL for the webpage address) and a description of the content of the linked webpage. The description of the linked content may include text and/or image data, and may include a full or summarized syndicated version of the linked content.

The verification module 123 verifies that each feed 503 is an authorized feed for a source. If the verification module 123 determines that a feed is an authorized feed for a source 111, the feed is added to the feed mapping database 124. If a feed is determined to be unauthorized, optionally, the feed may be added to the feed mapping database and marked as unauthorized for a particular source. Alternatively, items from a feed may be discarded or ignored if the feed is not an authorized feed for the source of the content associated with those items. For example, a CNN feed is authorized for CNN content. Typically, the feed contains links to CNN articles, but the feed can contain a link to a BBC article. In this example, the CNN feed is not an authorized source for the BBC article. Thus, the feed item from the CNN feed associated with the BBC article may be discarded or ignored.

To verify if a feed is an authorized feed for a respective item of the feed, for each item of the feed 504, the linked webpage in the item is accessed 505. Then, the verification module 123 verifies 506 if the linked webpage points back to the feed from which the item originated. The verification module 123 can verify this relationship by identifying the feed in the metadata associated with the webpage, such as a meta header or meta tag.

If the linked webpage points back to the feed from which the item originated, then the verification module 123 records 507 the item as containing an authorized syndicated description of the linked webpage content. If the linked webpage does not point back to the feed, the root of the domain of the webpage is similarly checked for metadata that points back to the feed.

If neither the linked webpage nor root domain points back to the feed, then optionally, the links on the original webpage are resolved and HTTP redirects are followed. Each linked webpage is checked to determine if it points back to the feed from which the item originated, thus checking if the webpage indirectly points back to the feed. Optionally, this process of checking if any linked page points back to the feed can be repeated for each of the web pages that are linked to from the original webpage, or for any other webpage that is within a selected number of degrees removed from the original webpage. If the webpage indirectly points back to the feed, then the verification module 123 records 507 the item as containing an authorized syndicated description of the linked webpage content.

Once an authorized syndicated description of web content has been verified, the description is stored for subsequent use to describe linked web content in connection with displaying a link to the content. To enable easier subsequent searching for this purpose, optionally, the address of the linked webpage may be stored in canonicalized form. To canonicalize an address, a sequence of production rules are applied to the address to modify it into a standardized and consistent form. Examples include converting the scheme and host to lower case; capitalizing letters in escape sequences; decoding percent-encoded octets of unreserved characters; removing the default port; removing dot-segments; removing directory index; removing the fragment; removing the IP; limiting protocols; removing duplicate slashes; sorting the query string variables; removing arbitrary query string variables; removing default query string variables; removing the "?" when the querystring is empty; standardizing character encoding; and other techniques of standardizing URLs known to those of skill in the art. The particular selection of canonicalization rules is determined by the system designer for efficiency and consistency. After applying a sequence of canonicalization rules, the canonicalized address is stored in association with the description of the linked content.

The feed mapping database 124 stores a mapping between webpage addresses and authorized descriptions of content at those addresses compiled from authorized feeds. Optionally, the feed mapping database 124 may also store a mapping between webpage addresses and authorized feeds for those web pages. By storing an authorized syndicated description of an item of web content in a database 124 in advance, the description selection module 125 of the page builder 133 has fast access to a description of the item of web content to include with the link to the content. Thus, when the page being built includes an item of user-generated content that links to an item of web content for which an authorized syndicated description already exists in the database 124, the description can be quickly obtained for display on the page.

Figure 6:
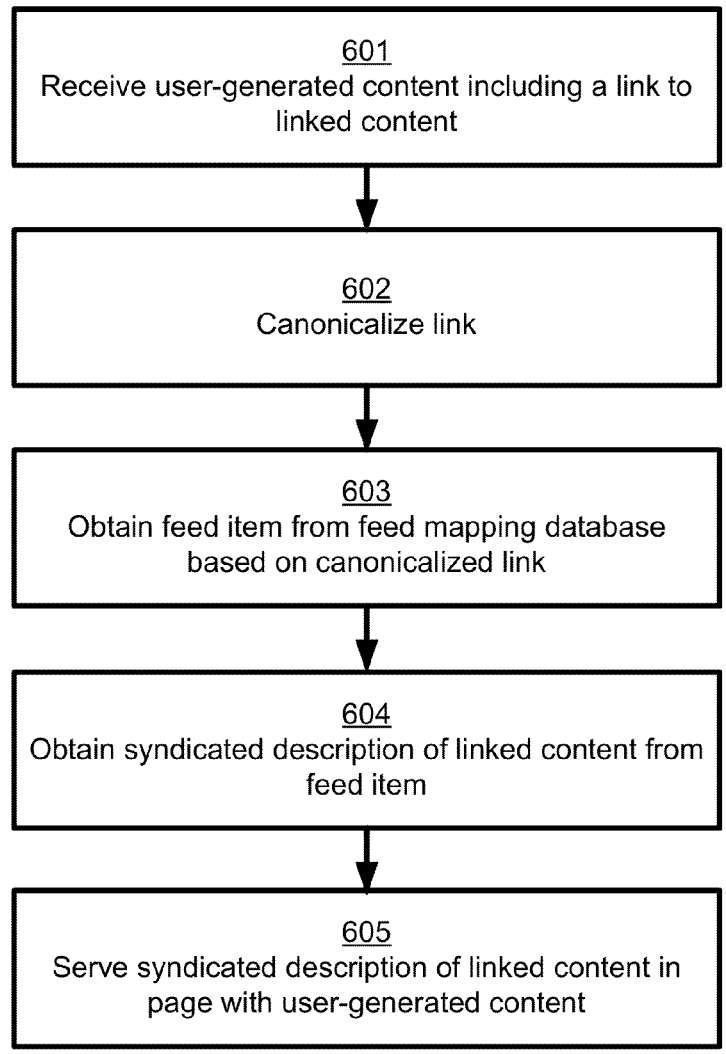
FIG. 6 illustrates a method of obtaining a syndicated description of linked content, in accordance with an embodiment.

FIG. 6 illustrates a method of obtaining an authorized syndicated description of linked content from the collection stored in the feed mapping database 124, in accordance with an embodiment. This method is applicable when user-generated content that includes a link to linked content has been received 601, for example by the content processing system 130.

The link to the linked content from the user-generated content is canonicalized 602. The canonicalization of the address of the linked content is performed according to the same or similar steps as described above to with respect to canonicalizing addresses of web pages from feeds. By storing canonicalized addresses for the links from the feeds and canonicalizing the addresses of linked content in user-generated content, the content processing system 130 is able to obtain better matches between them when the feed mapping database 124 is searched.

By looking up the canonicalized link for the linked content in the feed mapping database 124, one or more feed items may be returned. Any one item of linked content may be described by any number of feeds. Thus, if available, one or more authorized syndicated descriptions of the linked content are obtained 604 from the database 124 by the content processing system 130. If more than one authorized syndicated description of the linked content is available, selection rules can be applied to obtain the best description, for example, the longest description, the most recent description, the description containing an image if available, and the like. In one embodiment, the longest description is preferred, and between two descriptions of the same length, a description that includes an image is preferred.

Once the selected authorized syndicated description of the linked content is obtained 604, it is formatted and subsequently served 605 in a page with the user-generated content that included the link to the linked content. Accordingly, the user that receives the served page sees the user-generated content including a link to linked content and an authorized syndicated description of the linked content with the link to that content. After viewing the description of the linked content, the user may choose to navigate to the full version of the linked content by selecting the link, or not, depending on the user's interest level in the particular described content. Thus, the user's experience with the page is enhanced by seeing better context for the links that are provided in user-generated content.

Additional Configuration Considerations

The present invention has been described in particular detail with respect to several possible embodiments. Those of skill in the art will appreciate that the invention may be practiced in other embodiments. The particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer and run by a computer processor. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

In addition, the present invention is not limited to any particular programming language. It is appreciated that a variety of programming languages may be used to implement the teachings of the present invention as described herein, and any references to specific languages are provided for enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

What is claimed is:

1. A method executed by a processor for obtaining a corpus of authorized syndicated descriptions of web content, the method comprising:

obtaining items from a plurality of feeds from one or more sources, each item comprising a link to a content page and a description of content included in the content page;

for each of one or more items from one or more of the feeds, accessing the content page associated with a link included in an item;

analyzing metadata associated with the accessed content page to identify an indication of a source from which the content page was obtained;

determining whether the analyzed metadata associated with the accessed content page includes a pointer to the source from which a feed including the item was obtained;

responsive to determining that the accessed content page includes a pointer to the source from which the feed including the item was obtained, recording a description of content from the item for use as an authorized syndicated description of the item; and responsive to determining that the analyzed metadata associated with the accessed content page does not include the pointer to the source feed from which a feed including the item was obtained, checking a root of the domain for the content page for the pointer to the source feed from which the feed including the item was obtained; and generating a page including a selected item from the obtained items, the page including a pointer to the feed from which the selected item was obtained responsive to the description of content from the selected item being recorded as an authorized syndicated description of the selected item.

2. The method of claim 1, wherein determining whether the analyzed metadata associated with the accessed content page includes the pointer to the source from which a feed including the item was obtained comprises verifying the accessed content page includes pointer that points either directly or indirectly to the source from which the feed including the item was obtained.

3. The method of claim 1, wherein determining whether the analyzed metadata associated with the accessed content page includes the pointer to the source from which a feed including the item was obtained comprises verifying that metadata associated with the accessed content page identifies a domain associated with the source from which the feed including the item was obtained.

4. The method of claim 1, further responsive to determining whether the analyzed metadata associated with the accessed content page includes the pointer to the source from which a feed including the item was obtained, canonicalizing the address to the content page and storing the canonicalized address in association with the description of the content from the item.

5. A computer program product comprising a non-transitory computer-readable storage medium containing computer program code for obtaining a corpus of authorized syndicated descriptions of web content, the code for:

obtaining items from a plurality of feeds from one or more sources, each item comprising a link to a content page and a description of content included in the content page;

for each of one or more items of one or more of the feeds, accessing the content page associated with a link included in an item;

analyzing metadata associated with the accessed content page to identify an indication of a source from which the content page was obtained;

determining, using a processor, whether the analyzed metadata associated with the accessed content page includes a pointer to the source from which a feed including the item was obtained;

responsive to determining that the accessed content page includes a pointer to the source from which the feed including the item was obtained, recording a description of content from the item for use as an authorized syndicated description of the item; and responsive to determining that the analyzed metadata associated with the accessed content page does not include the pointer to the source feed from which a feed including the item was obtained, checking a root of the domain for the content page for the pointer to the source feed from which the feed including the item was obtained; and generating a page including a selected item from the obtained items, the page including a pointer to the feed from which the selected item was obtained responsive to the description of content from the selected item being recorded as an authorized syndicated description of the selected item.

6. The computer program product of claim 5, wherein determining whether the analyzed metadata associated with the accessed content page includes the pointer to the source from which a feed including the item was obtained comprises verifying the accessed content page includes a pointer that points either directly or indirectly to the source from which the feed including the item was obtained.

7. The computer program product of claim 5, wherein determining whether the analyzed metadata associated with the accessed content page includes the pointer to the source from which a feed including the item was obtained comprises verifying that metadata associated with the accessed content page identifies the source from which the feed including the item was obtained.

8. The computer program product of claim 5, further responsive to determining whether the analyzed metadata associated with the accessed content page includes the pointer to the source from which a feed including the item was obtained, canonicalizing the address to the content page and storing the canonicalized address in association with the description of the content from the item.

9. A system for obtaining a corpus of authorized syndicated descriptions of web content, the system comprising:

a processor;

a memory, communicatively coupled to the processor, storing instructions that, when executed by the processor, perform a method comprising:

obtaining items from a plurality of feeds from one or more sources, each item comprising a link to a content page and a description of content included in the content page;

for each of one or more items of one or more of the feeds, accessing the content page associated with a link included in an item;

analyzing metadata associated with the accessed content page to identify an indication of a source from which the content page was obtained;

determining whether the analyzed metadata associated with the accessed content page includes a pointer to the source from which a feed including the item was obtained;

responsive to determining that the accessed content page includes a pointer to the source from which the feed including the item was obtained, recording a description of content from the item for use as an authorized syndicated description of the item; and responsive to determining that the analyzed metadata associated with the accessed content page does not include the pointer to the source feed from which a feed including the item was obtained, checking a root of the domain for the content page for the pointer to the source feed from which the feed including the item was obtained; and generating a page including a selected item from the obtained items, the page including a pointer to the feed from which the selected item was obtained responsive to the description of content from the selected item being recorded as an authorized syndicated description of the selected item.

* * * * *